UNITED STATES PATENT OFFICE.

CLARENCE H. SIMPSON, OF FRONT ROYAL, VIRGINIA, ASSIGNOR TO OLD VIRGINIA ORCHARD CO., INC., OF FRONT ROYAL, VIRGINIA.

APPLE JAM.

1,262,399.   Specification of Letters Patent.   Patented Apr. 9, 1918.

No Drawing.   Application filed February 15, 1918.   Serial No. 217,361.

*To all whom it may concern:*

Be it known that I, CLARENCE H. SIMPSON, a citizen of United States, and residing at Front Royal, in the county of Warren and State of Virginia, have invented certain new and useful Improvement in Apple Jam, of which the following is a specification.

This invention relates to the manufacture of apple jam, and it consists in the novel method of manufacturing the jam, and in the new food product itself.

In general terms the invention may be stated to consist in chopping or grinding the apples into pieces with the rind attached, then cooking the chopped apples with the rind thereon to prevent the breaking down of the cells of the particles of the apple to approximately a half done condition, and then adding thereto a proper amount of sugar and continuing the cooking until the apples are well done, and terminating the cooking before the breaking down of the cells of the larger particles of apples which prevents the mass from becoming a pulp and thereby producing the formation of an apple jam.

I am aware that heretofore apple marmalade and apple butter have been common food product, and I am also aware that it has heretofore been proposed to produce an apple jam, but it has not heretofore been accomplished.

Referring now more in detail to my new method and new food product, I remove the core of the apples and cut them up in pieces, approximately quartered with the rind attached. These quartered pieces are then chopped up into smaller pieces, or passed through a suitably constructed chopper reducing the quartered portions to pieces approximately $\tfrac{5}{16}''$ in size with the rind attached thereto. This chopping process produces some pulp and juice and a certain amount of the pulp and juice is necessary in the mass of chopped apple to produce the proper jam consistency and to aid in cooking.

I then add a proper amount of water to the mass in approximate proportions of eighteen gallons of water to one hundred pounds of chopped apple. This water and chopped apple are then cooked to approximately a half done condition and then there is added one pound of sugar to each pound of chopped apple, depending to a great extent to the acidity of the apple. The greater the acidity the greater the sugar added.

Also at this point should be added two gallons of water to every one hundred pounds of chopped apple, or to improve the flavor and texture of the jam, cooked apple juice or fruit pectin may be added in the place of water.

If the cooked apple juice or fruit pectin is added in the place of water, an additional amount of sugar must be added depending upon the amount of water of sugar carried by the apple juice of fruit pectin. The amount of sugar carried by apple juice or fruit pectin depends upon their jellying qualities which is previously determined by experiment. This experiment is a simple method of testing the congealing point with a spoon while cooking, and depends upon the experience of the operator. The sugar must not be added until the chopped apples are cooked considerably and preferably about half done, for I have discovered that if sugar is added to the chopped apples before they are considerably cooked, it will form a coating about the larger particles of the apple producing a preserve result which would prevent the quick cooking of the apple, increasing the evaporation, and the finished product would be dry and raw in taste and would not be of a jam nature.

The temperature at which the chopped apples are cooked and the length of time they are cooked depends upon the variety of apple, the acidity thereof, and the length of cooking and the temperature is varied according to the various conditions arising from the different variety of apples and is controlled by experience, but as just stated they are cooked considerably and preferably to approximately half done, which is also determined by experience.

The chopped apples are cooked to the degree above mentioned and the sugar added. Here again the length of cooking thereafter and the degrees of heat is determined by the variety of the apple and by experience of the person doing the cooking. The heat may range from approximately 216 F., to 221 degrees but it is essential that this cooking after the sugar is added must terminate just before the breaking down of the cells of the larger particles of the apples in order to produce an apple jam product, and to prevent the mass from becoming a pulp which would produce a variety of marmalade.

In my method the rind holds the larger particles of the apple together until they are sufficiently cooked and prevents them from going to pulp. As just stated the cooking must cease before the cells of the particles break down, and this depends again upon the variety of apples and must be determined by the experience of the cooker, as I find the temperature cannot be a guide.

The product thus produced by this method is an apple jam, and as I have heretofore stated so far as I am aware such a product has not heretofore been accomplished. My product is characterized by the fact that the particles of the apple contain the rind thereon and that it has a viscid consistency between that of a jelly and a marmalade; that the cells of the particles of the apple are unbroken by the cooking and are distributed throughout the entire mass, thus producing a jam consistency.

In making the product known as apple marmalade; the rind is removed and the apple is cooked; sugar being added after all of the cells of the apple have been almost completely broken down by the cooking. The consistency is between a preserve and a paste, or a smooth stiff mass.

Apple butter is made the same way as marmalade, with the exception that cider or vinegar is used in the place of water, and it is substantially the same consistency as a marmalade.

My apple jam differs from both of the above by the facts that the apples are cooked with the rind on them; by the fact that they are cooked about approximately half done and then sugar added thereto; by the fact that it is of a viscid consistency between that of jelly and a marmalade; by the fact that the cells of the particles of apples are unbroken by the cooking, and by the further fact that the particles of apple are distributed throughout the entire mass.

I desire it to be understood that suitable flavoring will be added to the product, and this preferably added near the end of the cooking so that the flavoring cooks into the product, but is not destroyed by evaporation.

Having thus described my invention what I claim and desire to secure by Letters Patent is:

1. A new product consisting of an apple jam which is characterized by the fact that it is composed of particles of apple with the rind attached thereto and having a consistency substantially between a jelly and a marmalade with the particles of the apple distributed throughout the entire mass.

2. A method of producing an apple jam consisting in reducing the apples to particles with the rind attached; cooking the apple to an approximately half done condition, adding sugar thereto and cooking the mass until the apple is well done but terminating the cooking before the cells of the apple particles are broken down, whereby an apple jam is produced as distinguished from other cooked apple products.

3. A method of producing an apple jam consisting in reducing the apple particles with the rind attached, adding water and fruit juice thereto; cooking the mass to approximately half done condition; adding the sugar thereto and then cooking the mass until the apples are well done but terminating the cooking before the cells of the apples are broken down thereby producing a product with a jam consistency as above distinguished from other cooked apple products.

In testimony whereof I hereunto affix my signature in the presence of two witnesses.

CLARENCE H. SIMPSON.

Witnesses:
R. B. HOLBROOK,
J. N. MAJOR.